(12) United States Patent
Egger et al.

(10) Patent No.: US 10,409,351 B2
(45) Date of Patent: Sep. 10, 2019

(54) COMPUTING DEVICES AND METHODS OF ALLOCATING POWER TO PLURALITY OF CORES IN EACH COMPUTING DEVICE

(71) Applicant: Samsung Electronics Co., Ltd., Suwon-si, Gyeonggi-do (KR)

(72) Inventors: Bernhard Egger, Seoul (KR); Younghyun Cho, Seoul (KR); Su-Rim Oh, Seoul (KR); Dong-hoon Yoo, Suwon-si (KR)

(73) Assignees: Samsung Electronics Co., Ltd., Gyeonggi-do (KR); Seoul National University R&DB Foundation, Seoul (KR)

( * ) Notice: Subject to any disclaimer, the term of this patent is extended or adjusted under 35 U.S.C. 154(b) by 67 days.

(21) Appl. No.: 15/788,293

(22) Filed: Oct. 19, 2017

(65) Prior Publication Data
US 2018/0246554 A1 Aug. 30, 2018

(30) Foreign Application Priority Data
Feb. 27, 2017 (KR) .......................... 10-2017-0025654

(51) Int. Cl.
G06F 1/32 (2019.01)
G06F 1/28 (2006.01)
(Continued)

(52) U.S. Cl.
CPC ................ G06F 1/28 (2013.01); G06F 1/206 (2013.01); G06F 1/324 (2013.01); G06F 1/3296 (2013.01)

(58) Field of Classification Search
CPC ............................... G06F 1/324; G06F 1/3296
See application file for complete search history.

(56) References Cited

U.S. PATENT DOCUMENTS 6,372,608 B1  4/2002  Shimoda et al.
6,645,830 B2  11/2003  Shimoda et al.
(Continued)

FOREIGN PATENT DOCUMENTS

KR   2013-0097505 A   9/2013

OTHER PUBLICATIONS

TAPE: Thermal-Aware Agent-Based Power Economy for Multi/Many-Core Architectures, Thomas Ebi, Mohammad Abdullah Al Faruque, Joerg Henkel, ICCAD 2009.

*Primary Examiner* — Albert Wang
(74) *Attorney, Agent, or Firm* — Harness, Dickey & Pierce, P.L.C.

(57) ABSTRACT

Provided are computing devices, each including a plurality of cores, and methods of allocating power to the plurality of cores. The computing device includes: a control core group including a plurality of control cores, the control core group configured to allocate a power budget to processing cores according to an energy management policy and state information of the processing cores, and transmit the allocated power budget to at least one of a lower control core and the processing cores; and a processing core group including at least one or more of the processing cores, the processing core group configured to perform computations based on the power budget allocated by the control core group, and transmit state information of the processing cores to the control core group, the state information of the processing cores having been modified based on the computations performed.

20 Claims, 10 Drawing Sheets

(51) Int. Cl.
*G06F 1/20* (2006.01)
*G06F 1/324* (2019.01)
*G06F 1/3296* (2019.01)

(56) References Cited

U.S. PATENT DOCUMENTS

| | | | |
|---|---|---|---|
| RE38,466 E | 3/2004 | Inoue et al. | |
| 6,711,691 B1 | 3/2004 | Howard et al. | |
| 6,818,465 B2 | 11/2004 | Biwa et al. | |
| 6,818,530 B2 | 11/2004 | Shimoda et al. | |
| 6,858,081 B2 | 2/2005 | Biwa et al. | |
| 6,967,353 B2 | 11/2005 | Suzuki et al. | |
| 7,002,182 B2 | 2/2006 | Okuyama et al. | |
| 7,084,420 B2 | 8/2006 | Kim et al. | |
| 7,087,932 B2 | 8/2006 | Okuyama et al. | |
| 7,154,124 B2 | 12/2006 | Han et al. | |
| 7,208,725 B2 | 4/2007 | Sherrer et al. | |
| 7,281,146 B2 | 10/2007 | Nalawadi et al. | |
| 7,288,758 B2 | 10/2007 | Sherrer et al. | |
| 7,319,044 B2 | 1/2008 | Han et al. | |
| 7,501,656 B2 | 3/2009 | Han et al. | |
| 7,709,857 B2 | 5/2010 | Kim et al. | |
| 7,759,140 B2 | 7/2010 | Lee et al. | |
| 7,781,727 B2 | 8/2010 | Sherrer et al. | |
| 7,790,482 B2 | 9/2010 | Han et al. | |
| 7,940,350 B2 | 5/2011 | Jeong | |
| 7,959,312 B2 | 6/2011 | Yoo et al. | |
| 7,964,881 B2 | 6/2011 | Choi et al. | |
| 7,985,976 B2 | 7/2011 | Choi et al. | |
| 7,994,525 B2 | 8/2011 | Lee et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,129,711 B2 | 3/2012 | Kang et al. | |
| 8,179,938 B2 | 5/2012 | Kim | |
| 8,263,987 B2 | 9/2012 | Choi et al. | |
| 8,324,646 B2 | 12/2012 | Lee et al. | |
| 8,386,808 B2 | 2/2013 | Therien et al. | |
| 8,399,944 B2 | 3/2013 | Kwak et al. | |
| 8,432,511 B2 | 4/2013 | Jeong | |
| 8,433,662 B2 | 4/2013 | Ferringer et al. | |
| 8,459,832 B2 | 6/2013 | Kim | |
| 8,502,242 B2 | 8/2013 | Kim | |
| 8,536,604 B2 | 9/2013 | Kwak et al. | |
| 8,735,931 B2 | 5/2014 | Han et al. | |
| 8,766,295 B2 | 7/2014 | Kim | |
| 9,069,555 B2 | 6/2015 | Fetzer et al. | |
| 9,477,296 B2 | 10/2016 | Gwak et al. | |
| 9,880,599 B1 * | 1/2018 | Allen-Ware | G06F 1/266 |
| 2015/0185816 A1 | 7/2015 | Petrica et al. | |
| 2015/0241947 A1 | 8/2015 | Allen-Ware et al. | |
| 2016/0062447 A1 | 3/2016 | Hsu et al. | |
| 2016/0179162 A1 * | 6/2016 | Eastep | G06F 1/3203 713/320 |
| 2016/0187944 A1 | 6/2016 | Eastep et al. | |

\* cited by examiner

COMPUTING DEVICES AND METHODS OF ALLOCATING POWER TO PLURALITY OF CORES IN EACH COMPUTING DEVICE

CROSS-REFERENCE TO RELATED APPLICATION

This application claims the benefit of Korean Patent Application No. 10-2017-025654, filed on Feb. 27, 2017, in the Korean Intellectual Property Office, the disclosure of which is incorporated herein in its entirety by reference.

BACKGROUND

1. Field

The present disclosure relates to computing devices each including a plurality of cores, and, to methods of dynamically allocating power to the plurality of cores.

2. Description of the Related Art

The computing device is evolving to integrate a plurality of cores or processors into a single integrated circuit to meet performance requirements of applications. For example, a multi-core processor is one in which two or more cores with arithmetic functions are integrated on a single processor. In addition, a many-core processor has also been developed in which more cores (usually more than 16) are integrated on a single processor. The multi-core processor and the many-core processor may be mounted on portable devices such as tablet personal computers (PCs), mobile phones, personal digital assistants (PDAs), laptop computers, media players, Global Positioning System (GPS) devices, electronic book terminals, MP3 players, and digital cameras, or embedded devices including multimedia chips mounted on a televisions (TVs).

It may be desirable to devise methods of managing power and heat-generation of cores in a multi-core processor or many-core processor.

SUMMARY

Provided are computing devices and methods of allocating power to processing cores in a group of hierarchically classified control cores included in each computing device.

Additional aspects will be set forth in part in the description which follows and, in part, will be apparent from the description, or may be learned by practice of the presented example embodiments.

According to some example embodiments, a computing device including a plurality of cores includes a control core group including a plurality of control cores, the control core group configured to allocate a power budget to processing cores according to an energy management policy and state information of the processing cores, and transmit the allocated power budget to at least one of a lower control core and the processing cores. The computing device also includes a processing core group including at least one or more of the processing cores, the processing core group configured to perform computations based on the power budget allocated by the control core group, and transmit state information of the processing cores to the control core group, the state information of the processing cores having been modified based on the computations performed; and the plurality of control cores being hierarchically classified according to a number of the processing cores to which the control cores allocate the power budget, the lower control core being a control core occupying a lower hierarchical layer than an upper control core.

According to some example embodiments, methods of allocating power to a plurality of cores include allocating, by a control core group, a power budget to processing cores according to an energy management policy and state information of the processing cores. The methods further include transmitting, by the control core group, the allocated power budget to at least one of a lower control core and the processing cores. The methods further include performing, by at least one of the processing cores included in a processing core group, computations based on the allocated power budget. Furthermore, the methods include transmitting, by the processing cores, state information of the processing cores to the control core group, the state information of the processing cores having been modified based on the computations performed; the control core group including control cores that are hierarchically classified according to a number of the processing cores to which the control cores allocate the power budget, the lower control core being a control core occupying a lower hierarchical layer than an upper control core.

According to some example embodiments, a control core group including a plurality of control cores configured in a plurality of hierarchical levels includes a root control core in an uppermost hierarchical level, configured to obtain an energy management policy and a power budget, and transmit the energy management policy and the power budget to a plurality of leaf control cores. The control core group further includes the plurality of leaf control cores in a lowermost hierarchical level, each of the plurality of leaf control cores configured to receive the energy management policy and the power budget from the root control core, and control at least one of a voltage and an operating frequency, of a subset of a plurality of processing cores, based on the received energy management policy and the received power budget.

BRIEF DESCRIPTION OF THE DRAWINGS

These and/or other aspects will become apparent and more readily appreciated from the following description of some example embodiments, taken in conjunction with the accompanying drawings in which.

DETAILED DESCRIPTION

Reference will now be made in detail to some example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. Expressions such as "at least one of," when preceding a list of elements, modify the entire list of elements and do not modify the individual elements of the list.

Figure 1:
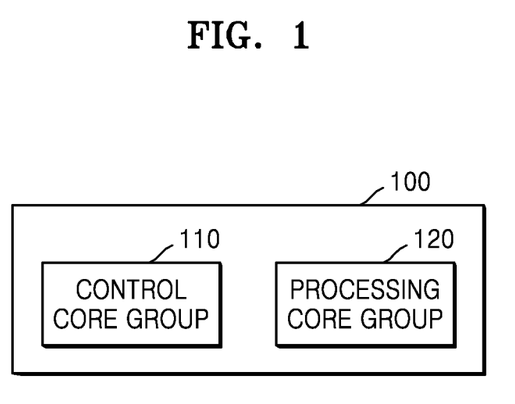
FIG. 1 is a block diagram of a configuration of a computing device including a control core group, according to some example embodiments.

FIG. 1 is a block diagram of a configuration of a computing device 100 including a control core group, according to some example embodiments.

The computing device 100 according to some example embodiments includes a plurality of cores, and the plurality of cores may be classified into a control core group 110 and a processing core group 120. It is to be understood by those of ordinary skill in the art that other general-purpose components may be further included in addition to the components shown in FIG. 1. According to some example embodiments, operations described herein as being performed by any or all of the control core group 110 and the processing core group 120 may be performed by at least one processor executing program code that includes instructions corresponding to the operations. The instructions may be stored in a memory. The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

The control core group 110 refers to a group of control cores which allocate a power budget to a processing core, according to an energy management policy and state information of the processing core, and transmit the power budget allocated to the processing core to at least one of a lower control core (a control core, or control core group, occupying a lower hierarchical layer is hereinafter referred to as a "lower control core") and the processing core. Here, the description of a control core may be the same as that of the processing core. However, the description of the control core is not limited thereto as long as the control core is capable of receiving the energy management policy and the state information of the processing core and calculating the power budget allocated to the processing core. According to some example embodiments, each control core and processing core may be a separate processor. Operations described herein as being performed by any or all of a control core and a processing core may be performed by at least one processor executing program code that includes instructions corresponding to the operations. The instructions may be stored in a memory.

Meanwhile, the energy management policy refers to a criterion for managing power consumption and the amount of heat generation of the computing device 100 and may be a policy based on at least one of the amount of computations of the processing core group 120, the amount of heat generated by the processing core group 120, and the amount of power consumed by the processing core group 120. In more detail, the energy management policy may include, but is not limited to, a policy for increasing the total amount of computations of the processing core group 120 included in the computing device 100, a policy for the processing core group 120 to perform computations based on a limited amount of power, and a policy for the processing core group 120 to perform computations based on an allowable amount of heat generation. Also, the state information of the processing core may be at least one of power consumption of the processing core, a cache miss ratio of the processing core, and information about computations performed by the processing core, but is not limited thereto as long as the state information indicates performance of the processing core.

The processing core group 120 refers to a group of processing cores that perform computations based on the power budget allocated by the control core group 110 and then transmit changed state information to the control core group 110 due to the computations of the processing cores. Here, a processing core may correspond to each core of the multi-core processor and the many-core processor, but is not limited thereto.

The plurality of control cores included in the control core group 110 may be hierarchically classified according to the number of processing cores to which the control cores allocate the power budget. An example of hierarchically classifying the control core group 110 will be described with reference to FIG. 2.

Figure 2:
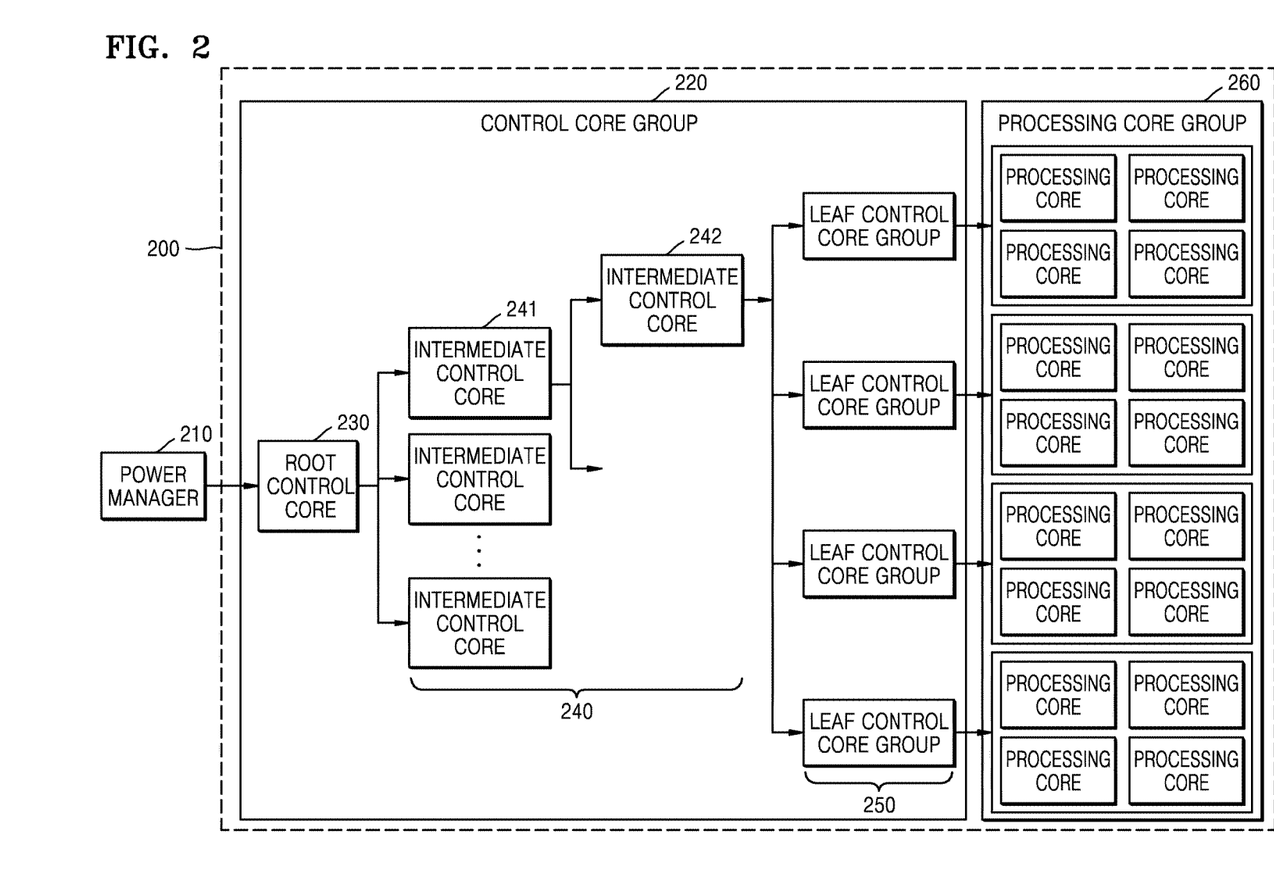
FIG. 2 is a block diagram of a configuration of a computing device including a control core group that further includes a root control core and a leaf control core group, according to some example embodiments.

FIG. 2 is a block diagram of a configuration of a computing device 200 including a control core group that further includes a root control core and a leaf control core group, according to some example embodiments.

Referring to FIG. 2, the computing device 200 may include a control core group 220 and a processing core group 260. The control core group 220 may include a root control core 230 and a leaf control core group 250. In addition, the computing device 200 may further include an intermediate control core group 240 according to a hierarchical structure of the control core group 220. Meanwhile, since the processing core group 260 of FIG. 2 corresponds to the processing core group 120 of FIG. 1, a detailed description thereof will not be given herein.

The root control core 230 may establish the energy management policy of the processing core group 260 and may transmit a power budget of a processing core managed by a lower control core to the lower control core. Although FIG. 2 shows the lower control core of the root control core 230 as the intermediate control core group 240, it is to be understood by those of ordinary skilled in the art that the lower control core of the root control core 230 may be at least one of the intermediate control core group 240 and the leaf control core group 250, according to the hierarchical structure of the control core group 220.

Meanwhile, the root control core 230 may establish an energy management policy or receive an energy management policy from a power manager 210 based on state information of the processing core received from the lower control core. The power manager 210 may be, but is not limited to, a system manager, a general-purpose Central Processing Unit (CPU), and a host processor capable of monitoring power consumption and heat generation of the computing device 200 and setting a target value for the power consumption and the heat generation of the computing device 200. In some example embodiments, the power manager 210 may be an external device to computing device 100.

The leaf control core group 250 may include a plurality of leaf control cores that receive a power budget from an upper control core (a control core, or control core group, occupying a higher hierarchical layer is hereinafter referred to as an "upper control core") and distribute power to the processing core. Although FIG. 2 shows the upper control core of the leaf control core group 250 as the intermediate control core group 240, it is to be understood by those of ordinary skilled in the art that the upper control core of the leaf control core group 250 may be at least one of the root control core 230 and the intermediate control core group 240, according to the hierarchical structure of the control core group 220.

The intermediate control core group 240 may include a plurality of intermediate control cores that receive a power budget from the root control core 230 and transmit a power budget of a processing core managed by the leaf control core group 250, to the leaf control core group 250. The intermediate control core group 240 may be hierarchically classified. Referring to FIG. 2, the intermediate control cores may be hierarchically classified according to the number of processing cores to which a power budget is allocated by the intermediate control cores. Here, an intermediate control core 241 of an upper layer may transmit a power budget of a processing core managed by an intermediate control core 242 of a lower layer, to the intermediate control core 242 of the lower layer. According to some example embodiments, operations described herein as being performed by any or all of the power manager 210, the control core group 220, the processing core group 260, the root control core 230, the intermediate control core group 240, the intermediate control core 241, the intermediate control core 242 and the leaf control core group 250 may be performed by at least one processor (e.g., the power manager 210) executing program code that includes instructions corresponding to the operations. The instructions may be stored in a memory.

Figure 3:
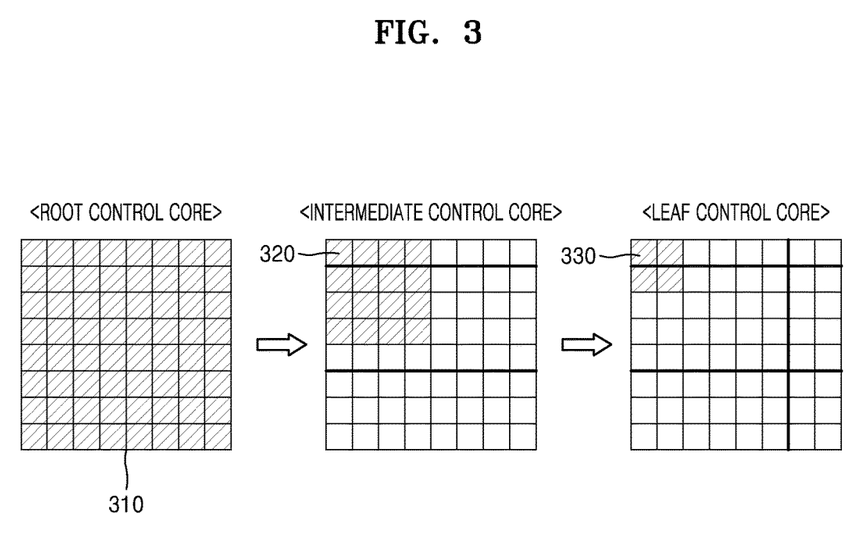
FIG. 3 illustrates the number of processing cores allocated to corresponding control cores, according to some example embodiments.

FIG. 3 illustrates the number of processing cores allocated to corresponding control cores, according to some example embodiments. Redundant descriptions between FIGS. 1, 2 and 3 may be omitted.

According to some example embodiments, control cores included in the control core group 220 may be hierarchically classified according to the number of the processing cores to which the control cores allocate a power budget.

FIG. 3 shows a processing core group including 8×8 processing cores. Referring to FIG. 3, a root control core may allocate a power budget to all processing cores 310 included in the processing core group.

Meanwhile, an intermediate control core may allocate a power budget to a subset 320 of the processing cores 310 included in the processing core group. For example, if the intermediate control core group 240 includes four intermediate control cores in a single layer, the number of processing cores to which one intermediate control core allocates a power budget may be 16. However, it is to be understood by those of ordinary skilled in the art that the number of processing cores to which one intermediate control core allocates a power budget may be different for each intermediate control core.

Meanwhile, a leaf control core may receive a power budget from an upper control core and control the power of the processing cores. For example, the leaf control core may allocate a power budget to a subset 330 of the processing cores 320 to which a power budget is allocated by an intermediate control core. Thus, the number of processing cores 330 to which power is distributed by the leaf control core is less than the number of the processing cores 320 to which a power budget is allocated by an intermediate control core.

In addition, since the computing device 100 according to some example embodiments includes the control core group 110 in addition to the processing core group 120, all the processing cores may perform computations. In addition, since the control core groups 110 are hierarchically classified, control cores may efficiently exchange information. Methods of dynamically allocating power by hierarchically classified control cores will be described with reference to FIG. 4.

Figure 4:
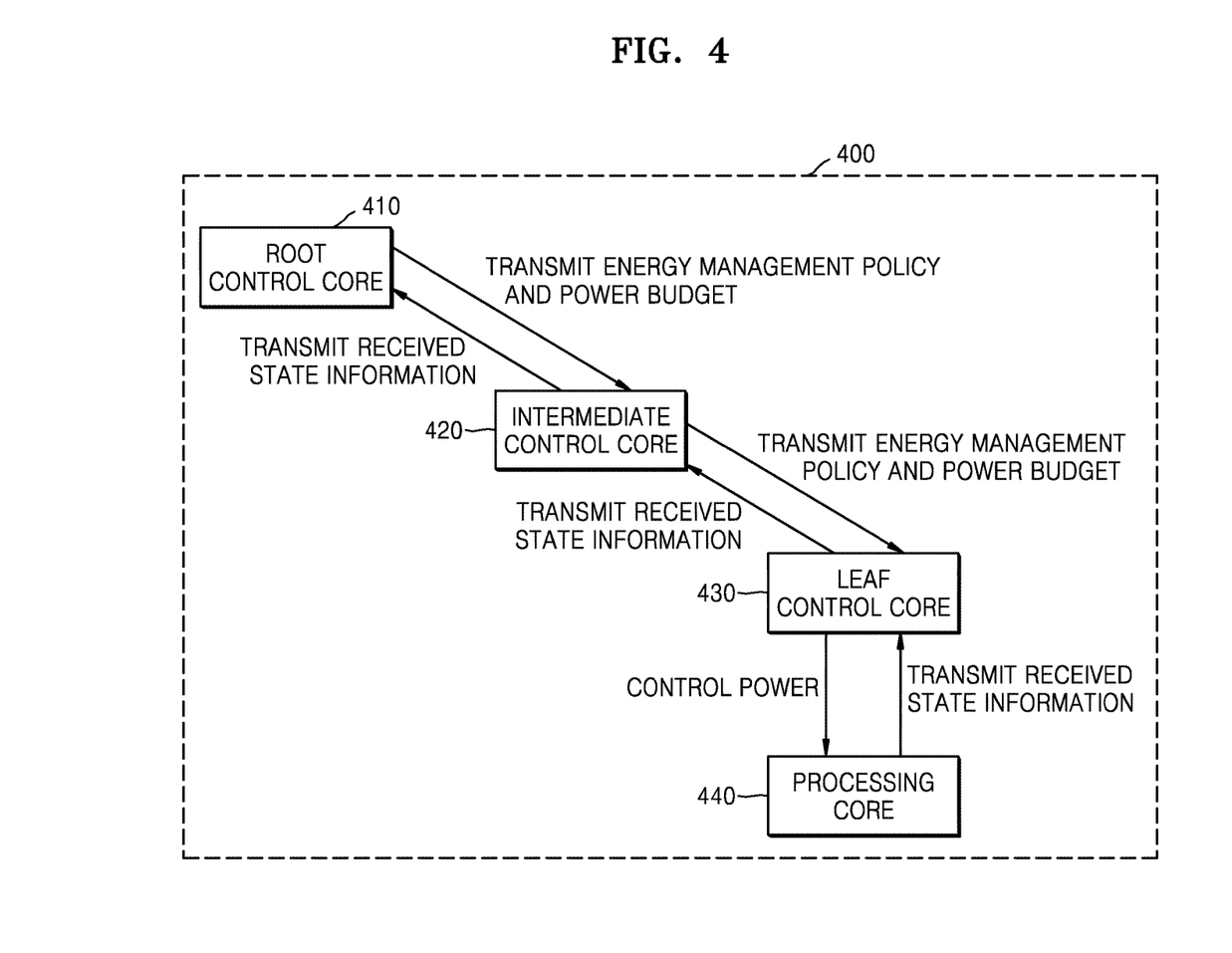
FIG. 4 is a flow diagram illustrating the operations of a computer including control cores, according to some example embodiments.

FIG. 4 is a flow diagram illustrating the operations of a computer 400 including control cores, according to some example embodiments. The computer 400 may include a root control core 410, an intermediate control core 420, a leaf control core 430 and a processing core 440. According to some example embodiments, operations described herein as being performed by any or all of the root control core 410, the intermediate control core 420, the leaf control core 430 and the processing core 440 may be performed by at least one processor executing program code that includes instructions corresponding to the operations. The instructions may be stored in a memory.

A control core group according to some example embodiments, according to state information of a processing core received from the processing core via a lower control core, may reallocate a power budget allocated to another lower control core and another processing core.

Referring to FIG. 4, a leaf control core 430 may allocate a power budget to the processing core 440 based on a power budget received from an intermediate control core 420. The leaf control core 430 may calculate the power budget allocated to the processing core 440 by taking into account state information of the processing core 440 received from the processing core 440.

Meanwhile, the leaf control core 430 may dynamically control a voltage and an operating frequency of the processing core 440 and may block power of the processing core 440 based on a power budget received from an upper control core. For example, when the leaf control core 430 receives, from an upper control core, an energy management policy that keeps the total amount of computations of the processing core 440 constant while limiting power consumption, the leaf control core 430 may block power or reduce the voltage or operating frequency of the processing core 440.

Meanwhile, the processing core 440 may collect the state information of the processing core 440 including power consumption, a cache miss ratio, the number of specific instruction words executed, and the like, and may transmit the state information to the leaf control core 430.

The intermediate control core 420, according to an energy management policy and a power budget received from a root control core 410 and the state information of the processing core 440 received from the leaf control core 430, may reallocate a power budget allocated to another leaf control core to the leaf control core 430. The intermediate control core 420 may also transmit the state information of the processing core 440 to the root control core 410.

The root control core 410, according to the state information of the processing core 440 received from the intermediate control core 420, may reallocate a power budget allocated to another intermediate control core to the processing core 440. In addition, the root control core 410 may dynamically change the energy management policy according to the state information of the processing core 440 received from the intermediate control core 420.

Figure 5:
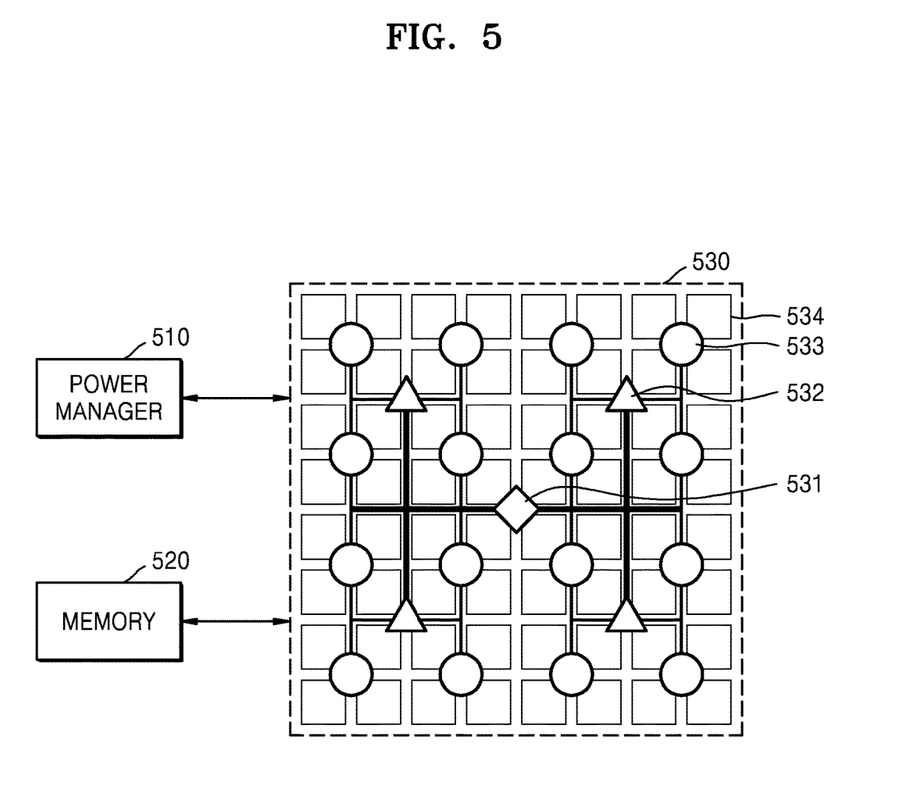
FIG. 5 illustrates a structure of a computing device including control cores and a power manager, according to some example embodiments.

FIG. 5 illustrates a structure of a computing device 530 including control cores and a power manager, according to some example embodiments.

Referring to FIG. 5, the computing device 530 may be connected to a power manager 510 and a memory 520. Furthermore, the computing device 530 may include a root control core 531, a leaf control core 533, and a processing core 534, and may further include an intermediate control core 532 according to a hierarchical structure of a control core group. According to some example embodiments, operations described herein as being performed by any or all of the power manager 510, the root control core 531, the leaf control core 533, the processing core 534 and the intermediate control core 532 may be performed by at least one processor executing program code that includes instructions corresponding to the operations. The instructions may be stored in a memory (e.g., memory 520).

Referring to FIG. 5, the root control core 531 is connected to the intermediate control core 532. Therefore, the root control core 531 may transmit a power budget of the processing core 534 to the intermediate control core 532 instead of directly accessing the processing core 534. Since the intermediate control core 532 is connected to the leaf control core 533, a power budget allocated to some processing cores included in a processing core group may be transmitted to the leaf control core 533. The leaf control core 533 may be connected to the processing core 534 to directly distribute power to the processing core 534.

Meanwhile, the root control core 531 may be connected to the power manager 510 to receive an energy management policy of the computing device 530.

Figure 6:
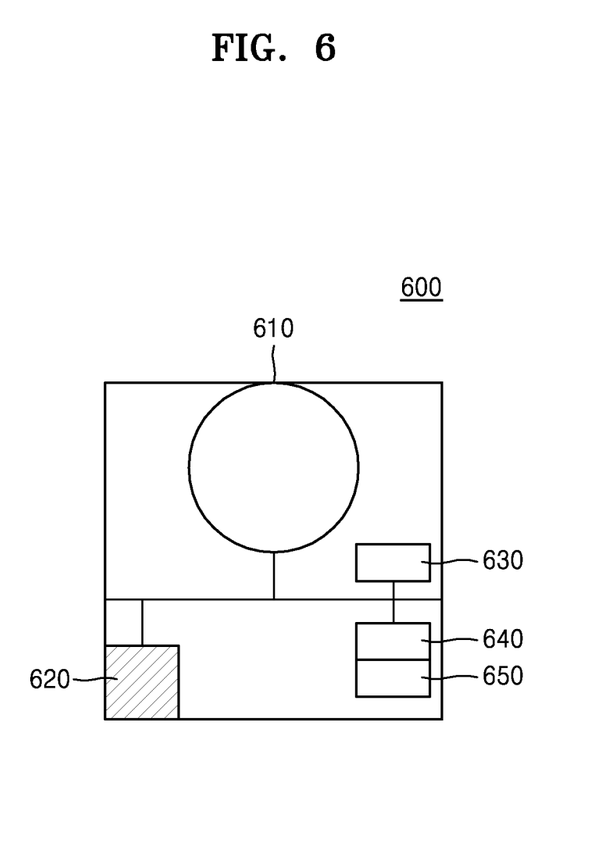
FIG. 6 illustrates a structure of a processing core, according to some example embodiments.

FIG. 6 illustrates a structure of a processing core 600 according to some example embodiments.

The processing core 600 according to some example embodiments may monitor its state and transmit state information to a leaf control core. For example, referring to FIG. 6, the processing core 600 may include a core 610 for performing computations, a router 620 for communicating with an external device, a performance monitor 630, and a dynamic control manager 640.

The performance monitor 630 may monitor operating characteristics of the core 610 and transmit monitoring results to a leaf control core via the router 620. For example, the performance monitor 630 may monitor computations of the core 610, the cache miss ratio of the core 610, the number of specific computations among the computations performed by the core 610, but information that may be monitored is not limited thereto.

The dynamic control manager 640 may receive information regarding a voltage and an operating frequency of the core 610 from the leaf control core via the router 620 and may control the core 610 according to the received voltage and operating frequency.

In addition, the processing core 600 according to some example embodiments may include a thermal sensor 650 to collect heat information. The thermal sensor 650 may measure the temperature of the processing core 600 and transmit measurement results to the leaf control core via the router 620. For example, if the processing core 600 includes the thermal sensor 650, a computing device may allocate a power budget to the processing core 600 according to an energy management policy based on the amount of heat generated by the processing core 600. According to some example embodiments, operations described herein as being performed by any or all of the core 610, the router 620, the performance monitor 630, the dynamic control manager 640 and the thermal sensor 650 may be performed by at least one processor executing program code that includes instructions corresponding to the operations. The instructions may be stored in a memory.

Figure 7:
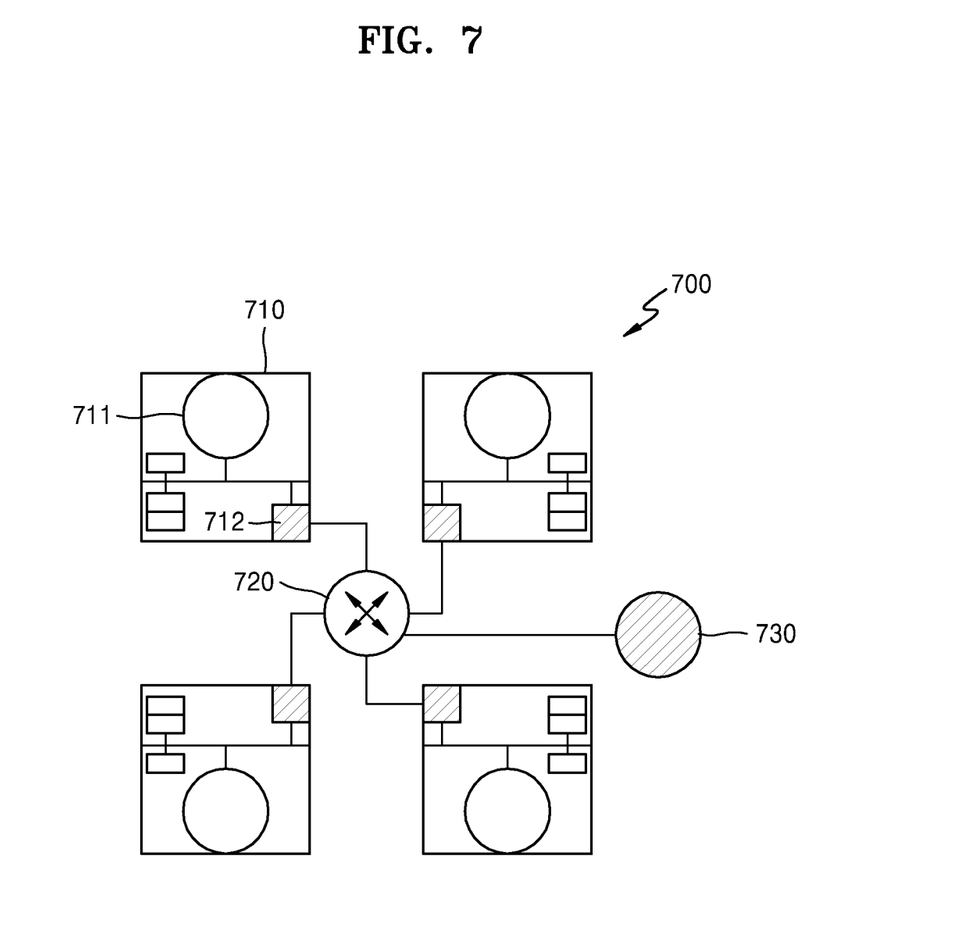
FIG. 7 illustrates the interconnectivity of a leaf control core and processing cores, according to some example embodiments.

FIG. 7 illustrates the interconnectivity of a leaf control core 730 and processing cores 710 according to some example embodiments.

The leaf control core 730 according to some example embodiments may distribute power to the plurality of processing cores 710. For example, referring to FIG. 7, the leaf control core 730 may be connected to four processing cores 710 and may be configured to calculate a power budget of each of the processing cores 710 and to distribute power to each of the processing cores 710 based on calculation results. A core 711 and a router 712 in FIG. 7 correspond to the core 610 and the router 620 in FIG. 6, respectively, and thus a detailed description thereof will not be given herein.

A processing core 710 may be connected to an external router 720 via the router 712 and the external router 720 may be connected to the leaf control core 730. Thus, the leaf control core 730 may directly control the processing core 710. Although FIG. 7 shows that a single core 711 is included in the processing core 710, the number of cores 711 in the processing core 710 is not limited thereto. According to some example embodiments, operations described herein as being performed by any or all of the processing core 710, the core 711, the router 712, the external router, and the leaf control core 730 may be performed by at least one processor executing program code that includes instructions corresponding to the operations. The instructions may be stored in a memory.

The router 712 and the external router 720 may communicate with each other according to a Network-on-Chip (NoC) communication method or a bus communication method. However, a communication method of the router 712 and the external router 720 is not limited thereto.

Although FIG. 7 shows that the leaf control core 730 may distribute power to four processing cores 710, the number of processing cores 710 to which the leaf control core 730 may distribute power is not limited thereto.

Figure 8:
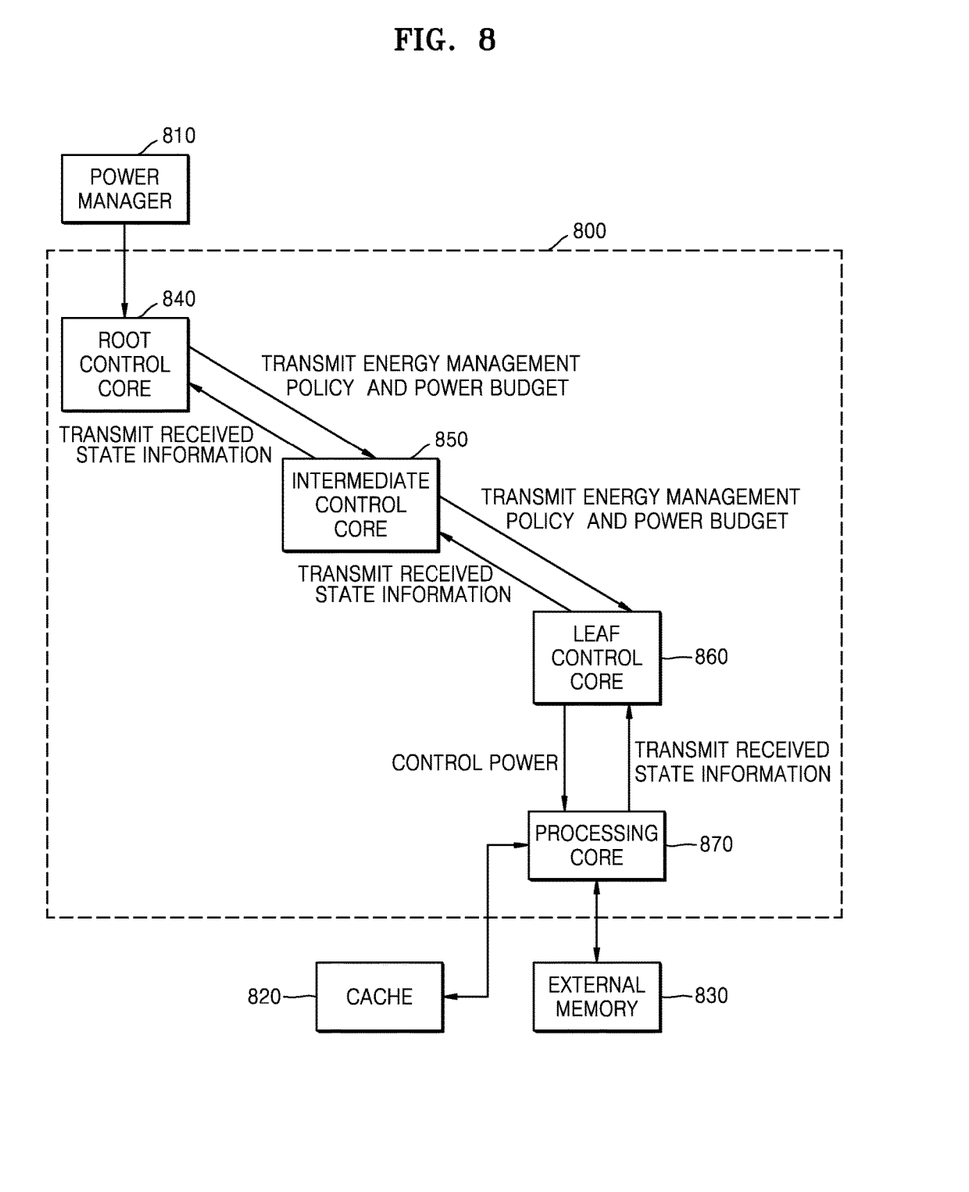
FIG. 8 is a flow diagram illustrating the operations of a computing device including control cores and connected to a power manager, according to some example embodiments.

FIG. 8 is a flow diagram illustrating the operations of a computing device 800 including control cores and connected to a power manager according to some example embodiments.

The computing device 800 according to some example embodiments may be connected to a power manager 810, a cache 820, and an external memory 830. Meanwhile, a root control core 840, an intermediate control core 850, and a leaf control core 860 of FIG. 8 correspond to the root control core 410, the intermediate control core 420, and the leaf control core 430 of FIG. 4, respectively, and thus a detailed description thereof will not be given herein.

The root control core 840 may establish an energy management policy based on state information of a processing core 870 received from the intermediate control core 850. In addition, the root control core 840 may receive an energy management policy from the power manager 810.

Meanwhile, the state information of the processing core 870 may include a cache miss ratio of the processing core 870. The cache miss ratio indicates a case where data or an instruction word requested by the processing core 870 is not stored in the cache 820. If the cache miss ratio of the processing core 870 increases, the number of times the processing core 870 accesses the external memory 830 increases, and the processing core 870 consumes a higher amount of energy to perform computations. According to some example embodiments, operations described herein as being performed by any or all of the power manager 810, the root control core 840, the intermediate control core 850, the leaf control core 860 and the processing core 870 may be performed by at least one processor (e.g., the power manager 810) executing program code that includes instructions corresponding to the operations. The instructions may be stored in a memory (e.g., external memory 830).

Figure 9:
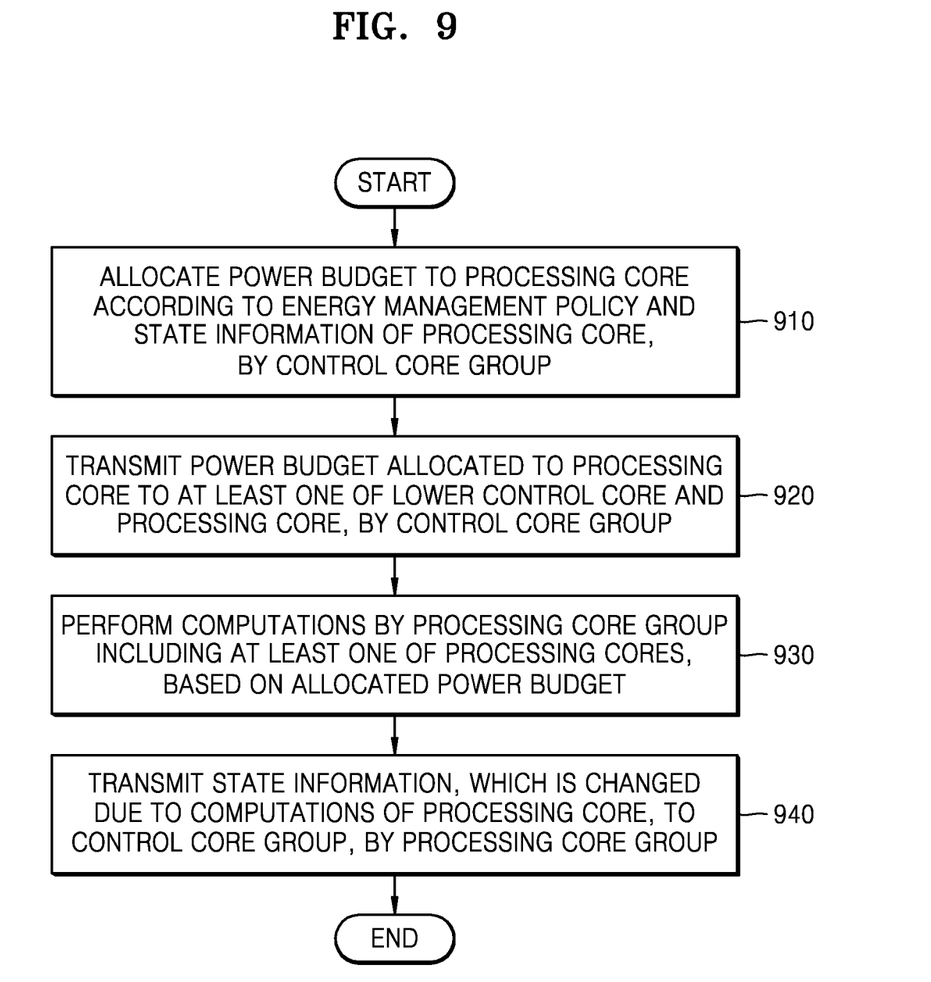
FIG. 9 is a flowchart of methods of allocating power to a plurality of cores using a control core group, according to some example embodiments.

FIG. 9 is a flowchart of methods of allocating power to a plurality of cores using a control core group, according to some example embodiments. Redundant descriptions between FIGS. 1 and 9 may be omitted.

In operation 910, the control core group 110 may allocate a power budget to a processing core according to an energy management policy and state information of the processing core. A plurality of control cores included in the control core group 110 may be hierarchically classified according to the number of processing cores to which the control cores (e.g., of control core group 110) allocate the power budget.

The energy management policy refers to a criterion for managing power consumption and the amount of heat generation of the computing device 100. The energy management policy may be a policy based on at least one of the amount of computations of the processing core group 120, the amount of heat generated by the processing core group 120, and the amount of power consumed by the processing core group 120. In more detail, the energy management policy may include, but is not limited to, a policy for increasing the total amount of computations of the processing core group 120 included in the computing device 100, a policy for the processing core group 120 to perform computations based on a limited amount of power, and a policy for the processing core group 120 to perform computations based on an allowable amount of heat generation.

Also, the state information of the processing core may include at least one of power consumption of the processing core, a cache miss ratio of the processing core, and information about computations performed by the processing core, but is not limited thereto as long as the state information corresponds to the performance of the processing core.

In more detail, the control core group 110 may include a root control core and a leaf control core group.

The root control core may establish the energy management policy of the processing core group 120 and may transmit a power budget of a processing core managed by a lower control core to the lower control core. Furthermore, the root control core may establish the energy management policy based on the state information or receive the energy management policy from a power manager.

The leaf control core group may include at least one leaf control core that receives a power budget from the upper control core(s) and distributes power to the processing core. In more detail, the leaf control core may dynamically control a voltage and an operating frequency of the processing core based on a power budget received from an upper control core. In addition, the leaf control core may block power of one or more processing cores included in the processing core group 120 based on the power budget received from the upper control core.

In addition, the control core group 110 may further include an intermediate control core group. An intermediate control core group is a group including a plurality of intermediate control cores that receives the power budget from the root control core and transmits the power budget of the processing core managed by the leaf control core group, to the leaf control core group. When the intermediate control cores are hierarchically classified according to the number of processing cores to which the power budget is allocated, the intermediate control cores of an upper layer may allocate a power budget of a processing core managed by an intermediate control core of a lower layer, to the intermediate control core of the lower layer.

In operation 920, the control core group 110 may transmit the power budget allocated to the processing core to at least one of a lower control core and the processing core.

In operation 930, the processing core group 120, including at least one of the processing cores, may perform computations based on the allocated power budget.

In operation 940, the processing core group 120 may transmit state information, changed due to the computations of the processing core, to the control core group 110.

Meanwhile, the computing device 100 may further include a thermal sensor for measuring the temperature of the processing core. As a result, the state information of the processing core may further include heat generation information of the processing core received from the thermal sensor.

Figure 10:
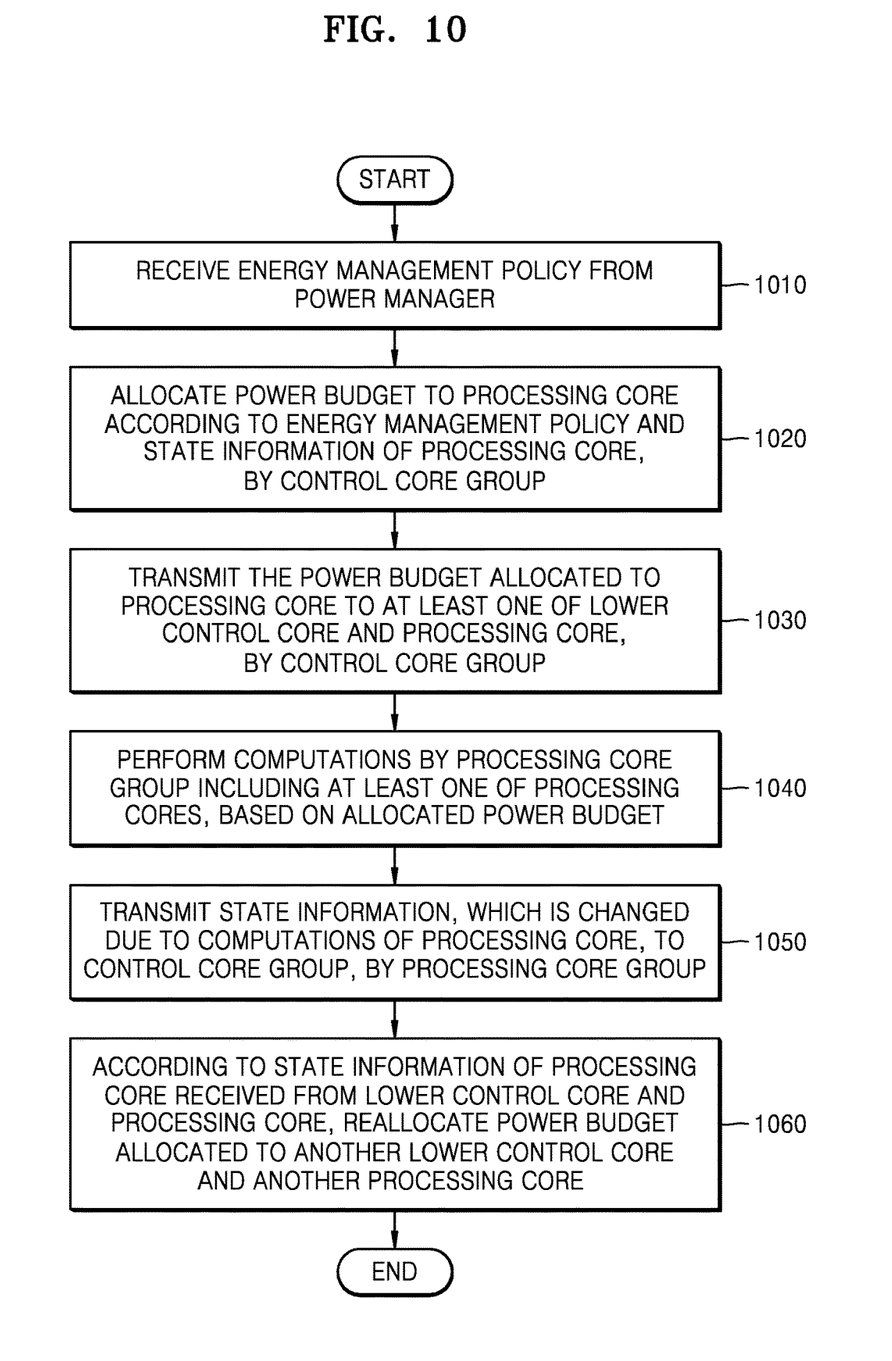
FIG. 10 is a detailed flowchart of methods of allocating power to a plurality of cores using a control core group and a power manager, according to some example embodiments.

FIG. 10 is a detailed flowchart of methods of allocating power to a plurality of cores using a control core group and a power manager, according to some example embodiments.

FIG. 10 is a view for explaining methods of allocating power to a plurality of cores by the computing device 100 in detail, and it is to be understood by those of ordinary skilled in the art that the methods of allocating power to a plurality of cores may vary depending on a configuration of the computing device 100. Furthermore, operations 1020, 1030, 1040, and 1050 of FIG. 10 correspond to operations 910, 920, 930, and 940 of FIG. 9, respectively, and thus a detailed description thereof will not be given herein.

In operation 1010, the root control core may receive an energy management policy from the power manager.

In operation 1060, the plurality of control cores (e.g., of control core group 110), according to state information of a processing core received from a processing core via a lower control core, may reallocate a power budget allocated to another lower control core and another processing core.

According to some example embodiments, control cores are classified hierarchically, thereby efficiently allocating power to processing cores according to an energy management policy.

It should be understood that example embodiments described herein should be considered in a descriptive sense only and not for purposes of limitation. Descriptions of features or aspects within example embodiments should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A computing device including a plurality of cores, the computing device comprising:
a control core group including a plurality of control cores, the control core group configured to allocate a power budget to processing cores according to an energy management policy and state information of the processing cores, and transmit the allocated power budget to at least one of a lower control core of the plurality of control cores and the processing cores; and a processing core group including at least one or more of the processing cores, the processing core group configured to perform computations based on the power budget allocated by the control core group, and transmit state information of the processing cores to the control core group, the state information of the processing cores having been modified based on the computations performed; and the plurality of control cores being hierarchically classified according to a number of the processing cores to which the control cores allocate the power budget, the lower control core occupying a lower hierarchical layer than an upper control core of the plurality of control cores.

2. The computing device of claim 1, wherein the control core group further includes:

a root control core configured to establish the energy management policy of the processing core group, and transmit the power budget of the processing cores managed by the lower control core, to the lower control core; and a leaf control core group including a plurality of leaf control cores, the leaf control core group configured to receive the power budget from an upper control core and distribute power to the processing cores.

3. The computing device of claim 2, wherein the control core group is further configured to reallocate a power budget allocated to another lower control core and other processing cores according to state information of the processing cores received from the lower control core and the processing cores.

4. The computing device of claim 3, wherein the state information is at least one of power consumption of the processing cores, cache miss ratios of the processing cores, and computations performed by the processing cores.

5. The computing device of claim 2, wherein the control core group further includes:

an intermediate control core group, including a plurality of intermediate control cores, the intermediate control core group configured to receive a power budget from the root control core, and transmit the power budget of the processing cores managed by the leaf control core group to the leaf control core group;

the intermediate control cores being hierarchically classified according to the number of the processing cores to which the intermediate control cores allocate the power budget; and an intermediate control core of an upper hierarchical layer transmitting the power budget of the processing cores managed by an intermediate control core of a lower hierarchical layer, to the intermediate control core of the lower hierarchical layer.

6. The computing device of claim 2, wherein the root control core is further configured to establish the energy management policy based on the state information or receive the energy management policy from a power manager.

7. The computing device of claim 2, wherein the leaf control core group is further configured to dynamically control voltages and operating frequencies of the processing cores based on the power budget received from the upper control core.

8. The computing device of claim 2, wherein the leaf control core group is further configured to block power of one or more of the processing cores included in the processing core group based on the power budget received from the upper control core.

9. The computing device of claim 1, further comprising:

a thermal sensor configured to measure temperatures of the processing cores; and the state information further including heat generation information of the processing cores received from the thermal sensor.

10. The computing device of claim 9, wherein the energy management policy is based on at least one of computations of the processing core group, an amount of heat generated by the processing core group, and an amount of power used by the processing core group.

11. A method of allocating power to a plurality of cores performed by a computing device, the method comprising:

allocating, by a control core group, a power budget to processing cores according to an energy management policy and state information of the processing cores;

transmitting, by the control core group, the allocated power budget to at least one of a lower control core and the processing cores;

performing, by at least one of the processing cores included in a processing core group, computations based on the allocated power budget; and transmitting, by the processing cores, state information of the processing cores to the control core group, the state information of the processing cores having been modified based on the computations performed; and the control core group including control cores that are hierarchically classified according to a number of the processing cores to which the control cores allocate the power budget, the lower control core being a control core occupying a lower hierarchical layer than an upper control core.

12. The method of claim 11, further comprising:

establishing, by a root control core included in the control core group, the energy management policy of the processing core group;

transmitting, by the root control core, the power budget of the processing cores managed by the lower control core, to the lower control core;

receiving, by a leaf control core group included in the control core group, the power budget from an upper control core;

distributing, by the leaf control core group, power to the processing cores; and the leaf control core group including a plurality of leaf control cores.

13. The method of claim 12, further comprising:

reallocating, by the control core group, a power budget allocated to another lower control core and other processing cores, the reallocating being according to state information of the processing cores received from the lower control core and the processing cores.

14. The method of claim 12, further comprising:
receiving, by an intermediate control core group included in the control core group, a power budget from the root control core;
transmitting, by the intermediate control core group, the power budget of the processing cores managed by the leaf control core group to the leaf control core group;
the intermediate control core group including a plurality of intermediate control cores;
the intermediate control cores being hierarchically classified according to the number of the processing cores to which the intermediate control cores allocate a power budget; and
the allocating of the power budget o the processing cores further includes
allocating, by an intermediate control core of an upper hierarchical layer, the power budget of the processing cores managed by an intermediate control core of a lower hierarchical layer, to the intermediate control core of the lower hierarchical layer.

15. The method of claim 11, further comprising:
measuring temperatures of the processing cores; and
the state information further including heat generation information of the processing cores.

16. A control core group including a plurality of control cores configured in a plurality of hierarchical levels, comprising:
a root control core in an uppermost hierarchical level and configured to
obtain an energy management policy and a power budget, and
transmit the energy management policy and the power budget to a plurality of leaf control cores; and
the plurality of leaf control cores in a lowermost hierarchical level, each of the plurality of leaf control cores configured to
receive the energy management policy and the power budget from the root control core, and
control at least one of a voltage and an operating frequency, of a subset of a plurality of processing cores, based on the received energy management policy and the received power budget.

17. The control core group of claim 16, wherein
the root control core is further configured to receive the energy management policy from an external source.

18. The control core group of claim 16, wherein
the root control core is further configured to
receive state information of a plurality of processing cores from the plurality of leaf control cores, and
generate the energy management policy and the power budget based on the received state information; and
each of the plurality of leaf control cores is further configured to
receive state information from the subset of the plurality of processing cores, the state information having been modified based on computations performed by the subset of the plurality of processing cores according to the at least one of the voltage and the operating frequency, and
transmit the state information to the root control core.

19. The control core group of claim 18, wherein
the state information includes at least one of power consumption, a cache miss ratio, a number of specific instruction words executed, and temperature.

20. The control core group of claim 18, further comprising:
a plurality of intermediate control cores in at least one middle hierarchical level between the uppermost hierarchical level and the lowermost hierarchical level, configured to
receive (i) the energy management policy and the power budget from the root control core or a higher intermediate control core and (ii) the state information from a subset of the plurality of leaf control cores or a subset of lower intermediate control cores; and
transmit (i) the energy management policy and the power budget to the subset of the plurality of leaf control cores or the subset of lower intermediate control cores and (ii) the state information to the root control core or a higher intermediate control core.

* * * * *